No. 788,131. Patented April 25, 1905.

UNITED STATES PATENT OFFICE.

GUILFORD C. GLYNN, OF IOLA, KANSAS, ASSIGNOR OF ONE-THIRD TO FRANK B. SMITH.

METHOD OF MANUFACTURING REFRACTORY MATERIAL.

SPECIFICATION forming part of Letters Patent No. 788,131, dated April 25, 1905.

Application filed July 25, 1904. Serial No. 218,107.

*To all whom it may concern:*

Be it known that I, GUILFORD C. GLYNN, a citizen of the United States, residing at Iola, in the county of Allen and State of Kansas, have invented a new and useful Method of Manufacturing Refractory Material, (Case A,) of which the following is a specification.

This invention relates to a method of preparing refractory material to be employed in the manufacture of bricks as a lining for retorts or in any other position where an excessive heat is to be resisted.

The object of the invention is to present a material which when molded into bricks and burned or applied as a lining to the fire-bricks of retorts, furnaces, or the like will positively resist the action of heat and also the corrosive effects of certain slags, especially the combination of iron with silica and alumina, and which will also resist sudden changes of temperature without checking, cracking, or disintegrating.

The material from which the product is made is a clay found in certain parts of Missouri and known as "kaolinite." This clay has substantially the following composition: aluminium oxid, forty to fifty per cent.; silica, fifty to sixty per cent., and other impurities, such as oxid of iron, approximating one per cent. and magnesium oxid approximating two per cent.

The procedure of preparing the kaolinite for use is as follows: A suitable quantity is taken and dried in any preferred manner to free it from moisture or any uncombined water. It is then submitted to a grinding or crushing treatment until it is reduced to a fineness which will permit ninety-eight per cent. of the bulk to pass through an eighty-mesh screen. The pulverized mass is then burned in the presence of free air to eliminate from the substance impurities organic and volatile and also for the purpose of reducing the ferric compound to metallic iron. The heated product is then precipitated into water-bath, preferably one that is cool, with or without the addition of a flux. Where a flux is employed, and which may be calcium hydrate, its object is to secure certain changes in the physical structure of the particles of the material, such as freeing them from or rendering the silica amorphous. The action of the bath upon the kaolinite is to cause the particles to break up into angular fragments, in which condition they are best adapted for use. After the substance has thoroughly cooled the water is either tapped off or the material removed therefrom and is placed in molds and subjected to great pressure. After the molded material is allowed to dry it is burned at an intense heat.

Brick made from this substance possess refractory powers not possible of obtainment with ordinary fire-brick, and, moreover, these bricks have the quality of resisting the corrosive action of heat and slags, such as result in rapid destruction of the ordinary brick lining of retorts or furnaces. Instead of molding the material into bricks it may be used as a lining and applied to the interior of retorts as a plaster and will be thoroughly effective in shielding the fire-bricks or other lining of the apparatus from the destructive action of heat.

The procedure is simple, may be readily carried into effect without the employment of special machinery, and the product is therefore cheap and can be readily adapted to furnaces or retorts of any character.

Having thus described the invention, what is claimed is—

1. The herein-described method of preparing refractory material, which consists in taking a mass of kaolinite, freeing it from moisture or any uncombined water, pulverizing it, then burning the pulverized mass in the presence of free air to eliminate organic and volatile impurities and to reduce the ferric compound to metallic iron, and then precipitating the product, while heated, into a water-bath.

2. The herein-described method of preparing refractory material, which consists in taking a mass of kaolinite, freeing it from moisture or any uncombined water, pulverizing it, then burning the mass in the presence of free air to eliminate organic and volatile impurities and to reduce the ferric compound to metallic iron, precipitating the heated product into a cold water-bath to cause the particles to disintegrate, then allowing the mass to cool, then removing it from the bath and placing it in molds, subjecting it to high pressure therein, then drying and finally burning at a high heat.

3. The herein-described method of preparing refractory material, which consists in taking a mass of kaolinite, freeing it from moisture or any uncombined water, pulverizing it, then burning the mass in the presence of free air to eliminate organic and volatile impurities and to reduce the ferric compound to metallic iron, then precipitating the heated product into a cold water-bath in conjunction with a flux, then allowing the mass to cool, then removing it from the bath and placing it in molds, subjecting it to high pressure therein, then drying and finally burning at a high heat.

In testimony that I claim the foregoing as my own I have hereto affixed my signature in the presence of two witnesses.

GUILFORD C. GLYNN.

Witnesses:
JNO. F. GOSHORN,
FRANK B. SMITH.